(12) United States Patent
Wagner et al.

(10) Patent No.: US 8,028,644 B2
(45) Date of Patent: Oct. 4, 2011

(54) CABLE DRIVEN TACTOR

(75) Inventors: Christopher R. Wagner, Simi Valley, CA (US); Amanda Christiana, Ann Arbor, MI (US); Charles J. Jacobus, Ann Arbor, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 375 days.

(21) Appl. No.: 12/272,922

(22) Filed: Nov. 18, 2008

(65) Prior Publication Data

US 2009/0139359 A1 Jun. 4, 2009

Related U.S. Application Data

(60) Provisional application No. 60/992,163, filed on Dec. 4, 2007.

(51) Int. Cl.
*G08B 6/00* (2006.01)
*G09B 21/00* (2006.01)

(52) U.S. Cl. .......................................... 116/205; 74/469

(58) Field of Classification Search .................. 116/205; 74/469; 340/407.1, 407.2; 414/5; 434/112; 601/97, 101, 103, 107, 108, 111, DIG. 20
See application file for complete search history.

(56) References Cited

U.S. PATENT DOCUMENTS

| | | | | |
|---|---|---|---|---|
| 3,831,296 A * | 8/1974 | Hagle | | 434/112 |
| 4,779,615 A * | 10/1988 | Frazier | | 601/47 |
| 5,354,162 A * | 10/1994 | Burdea et al. | | 414/5 |
| 5,577,417 A * | 11/1996 | Fournier | | 74/523 |
| 5,669,818 A * | 9/1997 | Thorner et al. | | 463/30 |
| 6,174,298 B1 * | 1/2001 | Quinn et al. | | 601/137 |
| 6,979,164 B2 * | 12/2005 | Kramer | | 414/5 |
| 7,331,871 B2 * | 2/2008 | Lopez | | 463/47 |
| 7,495,654 B2 * | 2/2009 | Khoshnevis | | 345/156 |
| 2005/0250582 A1 * | 11/2005 | Lopez | | 463/47 |
| 2005/0267649 A1 * | 12/2005 | Lee | | 701/3 |
| 2010/0031808 A1 * | 2/2010 | Whitlow et al. | | 89/1.11 |
| 2010/0161079 A1 * | 6/2010 | Cutkosky et al. | | 623/66.1 |
| 2010/0271298 A1 * | 10/2010 | Vice et al. | | 345/156 |

FOREIGN PATENT DOCUMENTS

GB 2362329 A * 11/2001
JP 2001183973 A * 7/2001

* cited by examiner

*Primary Examiner* — Richard A. Smith
(74) *Attorney, Agent, or Firm* — Gifford, Krass, Sprinkle, Anderson & Citkowski, P.C.

(57) ABSTRACT

A tactor system transforms cable motion to tactor motion. A housing defining a plane is adapted for placement proximate to the skin of a user. A cable is operative to deform a tactor element in the housing, causing a portion of the element to move outwardly from the plane of the housing, thereby imparting a tactile sensation to the user's skin. For example, tension on the cable may cause a strip of flexible plastic or other suitable material to bend at a living hinge that moves outwardly from the plane of the housing. The cable may be driven by an actuator including. Two or more tactor elements may be disposed next to each other or in the same housing, with different elements being activated at different times to enhance the apparent frequency of the stimulus. For example, a reciprocating mechanism may be used to operate a pair of tactor elements out of phase with respect to one another. The cable may be controlled by a remote reciprocating mechanism, with a physical quick disconnect mechanism provided between the reciprocating mechanism and the cable.

20 Claims, 4 Drawing Sheets

CABLE DRIVEN TACTOR

REFERENCE TO RELATED APPLICATION

This application claims priority from U.S. Patent Application Ser. No. 60/992,163, filed Dec. 4, 2007, the entire content of which is incorporated herein by reference.

GOVERNMENT SUPPORT

This invention was made with Government support under Contract No. N68335-07-C-0259 awarded by the United States Navy. The Government has certain rights in the invention.

FIELD OF INVENTION

This invention is a method for mechanically transmitting tactile information signals. The tactile device discussed here is an embodiment of this method.

BACKGROUND OF THE INVENTION

Tactile Situational Awareness Systems (TSASs) use an array of vibrating elements (typically vibrating motor or voice coil devices) called tactors, integrated into a vest to provide a pilot with spatial information. Using the sense of touch allows pilots to receive continuous spatial orientation information, even while visually attending to the aircraft instruments or external targets. Similar vibrotactile interfaces have been used to augment balance function in vestibular-impaired individuals, to aid in mapping responses in the somatosensory cortex, and have also been proven useful when vestibular and proprioceptive cues are entirely absent, such as the introduction of an artificial gravity vector in microgravity environments.

The main limitation preventing widespread adoption of the TSAS are the shortcomings of current tactor technology. An ideal TSAS vest would be light enough that a pilot can comfortably wear it during the standard preflight preparations. The vest should also have a large number of integrated tactors that are thin, robust, and deliver a powerful tactile signal. Current tactile display systems are unable to meet these requirements, often being too large or heavy, and are unable to deliver a powerful enough signal, especially when the vest is worn on the outside of a pilot's flight suit. These tactors often operate at a fixed resonant or drive frequency on a small skin contact area which leads to saturation of certain mechanoreceptors, decreasing their sensitivity to stimuli.

Psychophysical limitations of the human sensory system on the torso drive the specification for TSAS design and actuation. Humans can perceive a maximum of 3 levels of amplitude and 5 levels of frequency on the torso. Current TSAS implementations usually modulate a base frequency with lower frequency information signals, and drive the tactors at full amplitude to maximize tactile sensation. Base frequencies range from 40 Hz to 250 Hz, with pulse frequencies from 1 Hz to 4 Hz. For position limitations, users can only distinguish five tactors from waist to armpit.

SUMMARY OF THE INVENTION

This invention is directed to a tactor system which, in contrast to existing designs, transforms cable motion (parallel to the skin surface) to tactor motion (normal to the skin surface). A cable-driven tactor system according to the invention includes a housing defining a plane adapted for placement proximate to the skin of a user, a tactor element disposed in the housing, and a cable operative to cause the tactor element to move outwardly from the plane of the housing, thereby imparting a tactile sensation to the user's skin.

In the preferred embodiments, the tactor element is a flexible piece of material having one end coupled to the housing and another end coupled to the cable. Tension applied to the cable deforms the piece of material, causing a portion of the material to move outwardly from the plane of the housing. The deformation may be in the form of bending, compressing, sliding, or torsion of the tactor element. For example, tension on the cable may cause a strip of flexible plastic or other suitable material to bend at a living hinge that moves outwardly from the plane of the housing.

The cable may be a string, wire, rope, line, or band, and may be disposed in a sheath, enabling the cable to pull and push on the tactor element, causing the tactor element to extend outwardly, and return back into, the housing. The cable is driven by an actuator which may include a reciprocating mechanism driven by a motor, solenoid, piston, crank-slider, crank-rocker or cam. The preferred reciprocating mechanism includes a slider coupled to the cable, and a crank wheel coupled to the slider through a linkage.

The reciprocating mechanism may further include a motorized drive wheel, and an idler wheel operative to selectively couple and decouple the motorized drive wheel to the crank wheel. The idler wheel may be actuated with a servo motor at low-frequency intervals top deliver more effective tactile signals to a user. The actuator may receive a signal causing the tactor element to communicate a corresponding tactile signal to a user. For example, the tactile signal may be used to gain the user's attention or to convey user orientation information, navigational directions, a gravity vector, or a message to the user.

Two or more tactor elements may be disposed next to each other or in the same housing, with different elements being activated at different times to enhance the apparent frequency of the stimulus. In one preferred configuration, pair of tactor elements are disposed in the housing, and the elements are operated out of phase with respect to one another. In this embodiment, the cable may have two ends, one connected to a respective one of the elements, with a reciprocating mechanism being operative to move the cable back and forth, thereby causing the elements to operate out of phase with respect to one another. Multiple reciprocating mechanisms may be driven by a single motor.

The cable may be controlled by a remote reciprocating mechanism, with a physical quick disconnect mechanism provided between the reciprocating mechanism and the cable. For example, the quick disconnect mechanism further include a gear or friction wheel coupled to the cable, a mating gear or friction wheel connected to the reciprocating mechanism, and wherein the gears or friction wheels make contact on a designated interface plane to transfer motion from the reciprocating mechanism to the cable.

DETAILED DESCRIPTION OF INVENTION

This invention is directed to the transformation from cable motion (parallel to the skin surface) to tactor motion (normal to the skin surface). For a given force and position input motion profile, it was our goal to maximize the output force delivered to the skin over a given cycle. Based upon previous research and implementations, we have generated the following design specifications for a Tactile Situational Awareness System TSAS tactor. The tactor should be thin and cover a large area (to stimulate more mechanoreceptors). The base vibration frequency should stimulate the rapidly adapting mechanoreceptors (RAI or RAII), while having distinguishable information states (usually modulating the base frequency at a lower frequency). The vibration should also be sufficiently powerful to apply a sufficient force or generate a large deflection of the skin. The weight should also be less than or equal to the current state-of-the-art electromechanical tactor (the C2 tactor from Engineering Acoustics, which weighs 17 g).

Current tactor technology is limited in its ability to generate high-amplitude signals without a tradeoff in size, weight, or cost. We overcame this limitation by separating the vibrating mechanism from the actuator. Power is mechanically transmitted to the vibrating mechanism through a cable. The main advantages to this approach over transmitting electrical signals to the best are cost and on-body weight. We can use standard off-the-shelf motors to generate large amplitude vibrations that can be felt through many layers of clothing without weighing down the user. The standard motors are more efficient and powerful than any motor that would fit directly into a vest. The tactor then becomes a simple hinged lever mechanism, which can be thin, lightweight and robust.

There are additional advantages for using a cable driven approach for tactile stimulation. The cable driven mechanism is modular, so different tactors (e.g., optimized for different regions on the body) can easily be interchanged. We can lower cost by with off-the-shelf motors that meet or exceed our cost/performance requirements. Also, we envision a system where only one costly power generation actuator is needed for entire tactile displays. Small, inexpensive servomotors can then be used to generate the information packets, by making and breaking a mechanical connection to the drive motor. Additionally, all components if the tactile device can be made out of nonmetal materials, separate from the driving motor making this approach conducive to magnetic resonance environments.

Figure 1A:
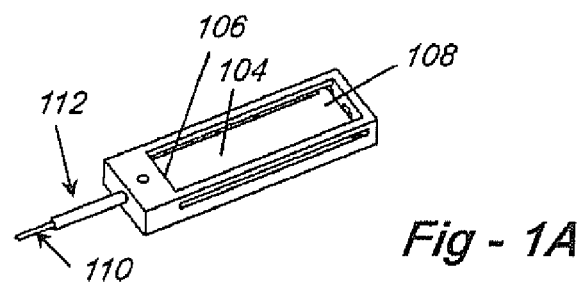
FIG. 1A shows a single tactor mechanism in an undeployed state.
Figure 1B:
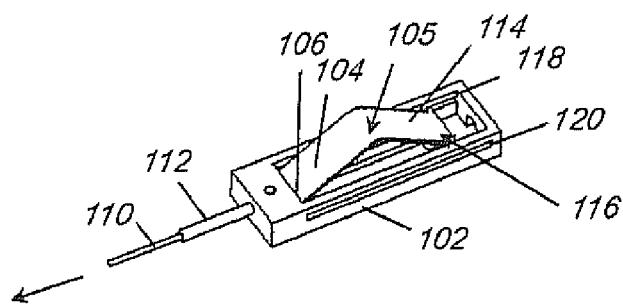
FIG. 1B shows the single tactor mechanism of FIG. 1A in a deployed state.

One embodiment of cable drive according to the invention is shown in FIGS. 1A and 1B. This embodiment comprises a thin case 102 defining a plane. The housing includes a tactor element in the form of a beam 104, having a central portion with a living hinge 105. The beam is fixed at the base of the case at 106 while the other end 108 is allowed to move freely along a linear track. As tension is applied through the cable 110 in sheath 112, a portion of the tactor element moves out of the plane of the housing through deformation, thereby imparting a tactile sensation to a user as shown in FIG. 1B.

The beam 104, preferably made of a suitable plastic material, has tabs 114, 116 on either side of end 108 that ride in raceways 118, 120, thereby maintaining contact with the flexing beam. Once tension is released, the pressure from contact with the body along with the elasticity of the material causes the beam to flatten out to its original position shown in FIG. 1A. An active pushing on the cable by the drive mechanism may be used in conjunction with, or in place of, passive relaxation of the beam material. Although in the preferred embodiments the cable is pulled and/or pushed, those of skill in the art of mechanics will appreciate that the cable may be rotated to cause deformation of the tactor element, through an intermediate element such as a cam, through torsion, or through other mechanisms.

The tactor is mounted relative to a user's body, in a vest, band, belt or other article, under, over, or between layers of clothing. As the beam bends and slides, normal indentation and lateral friction are applied to the skin surface. The amplitude of the displacement is only limited by the length of the beam and can be adjusted down by adjusting the displacement of the cable.

Figure 2A:
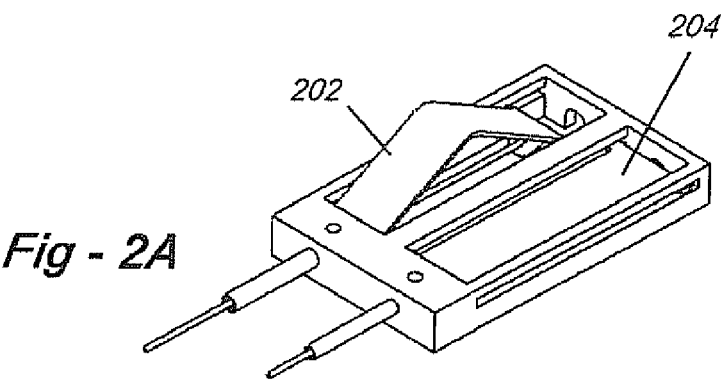
FIG. 2A shows a dual tactor mechanism with one of the tactor elements activated
Figure 2B:
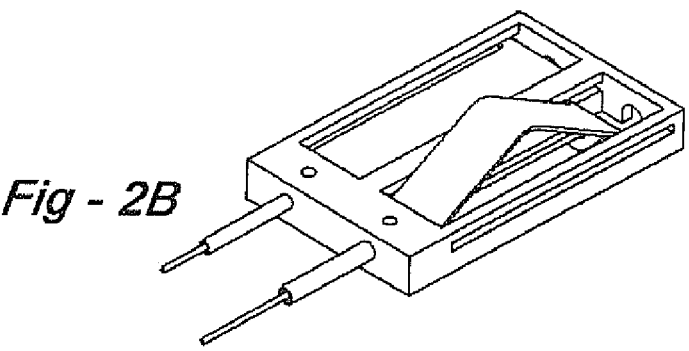
FIG. 2B shows the dual tactor mechanism of FIG. 2A with the other tactor element activated.

FIGS. 2A and 2B shows two beams 202, 204 placed side by side. The contact surface of each beam is close enough so that when these beams are actuated out of phase, the apparent frequency of the stimulus doubles (i.e., a 25 Hz signal to each tactor feels like a 50 Hz signal to the user). Adding further beams activated in phase and in close enough proximity allows for further amplification of apparent signal.

Figure 3A:
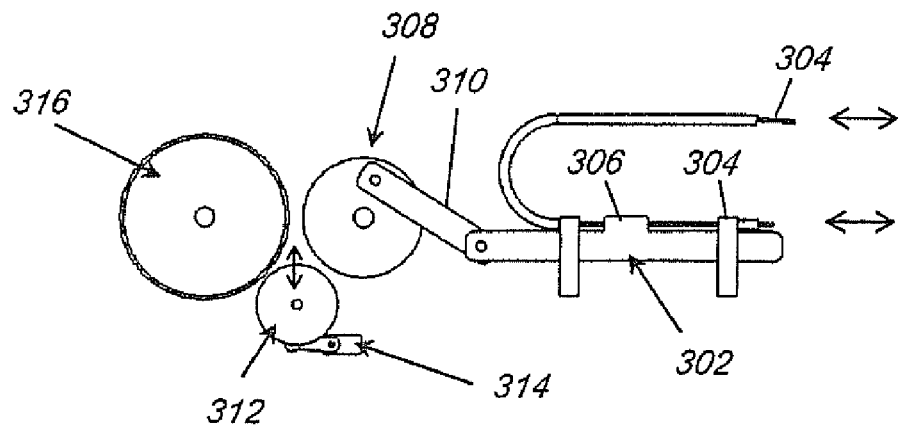
FIG. 3A shows one example of achieving the reciprocal out-of-phase motion used to drive a double beam tactor.
Figure 3B:
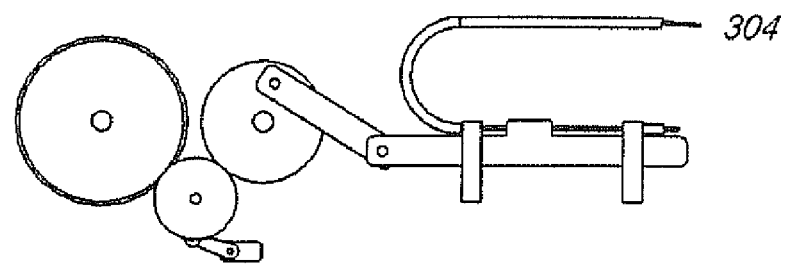
FIG. 3B shows a cable activating one remote tactor.
Figure 3C:
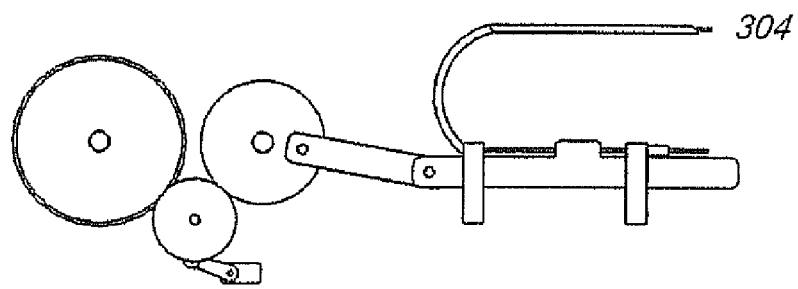
FIG. 3C shows a cable activating a different tactor.

FIGS. 3A-3C show one example of achieving the reciprocal out-of-phase motion used to drive a double beam tactor. In this embodiment a linear slider 302 attached to cable 304 at 306 moves the cable back and forth once each cycle of crank wheel 308 linked to slider 302 through linkage 310. FIG. 3B shows the cable 304 activating one remote tactor (not shown), and FIG. 3C shows cable 304 activating a different tactor. Other actuation methods may include a crank-rocker or cam mechanism, solenoids, piston and cylinder, etc. An idler wheel 312 can be used to generate low-frequency pulses of the higher frequency signal without starting and stopping the motor. A simple actuator 314 (such as a servo, piston, solenoid, etc.) makes and breaks the connection of the reciprocating motion mechanism to a drive wheel 316 in any desired variety of low-frequency patterns or intervals. This way you can fully utilize the inertia of the motor while still generating unique vibrotactile signals.

Figure 4A:
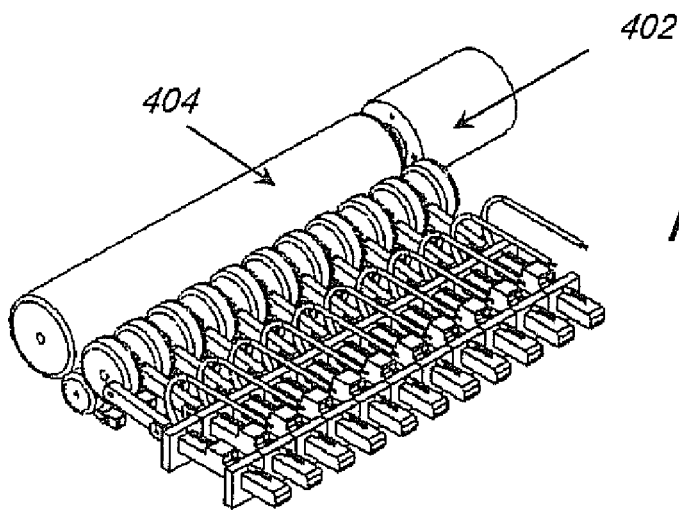
FIG. 4A shows views of single drive motor, multiple servomotor arrangement to generate multiple and independent tactor signals.
Figure 4B:
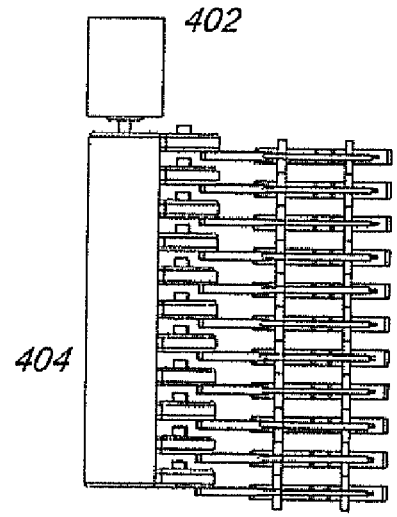
FIG. 4B is a top-down view of the configuration of FIG. 4A.
Figure 4C:
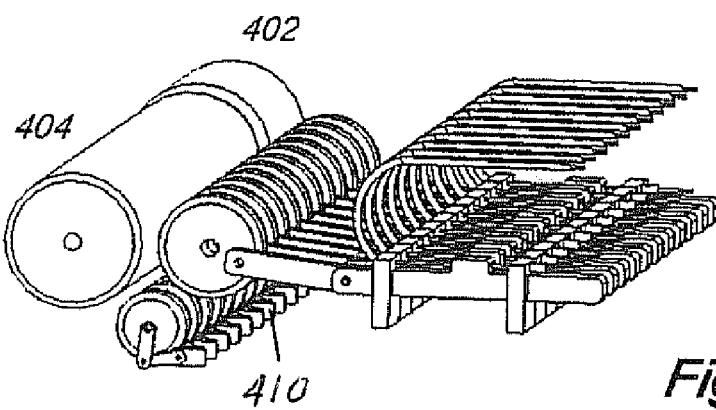
FIG. 4C is a different perspective view of the configuration of FIG. 4A.

FIGS. 4A-4C show how several tactors may be driven from a single motor 402 via drive shaft 404. FIG. 4A is an oblique, perspective view of the mechanism, FIG. 4B is a top-down view, and FIG. 4C is a different perspective view. The motor 402 may operate at a constant speed, while each reciprocating mechanism being activated through clutch mechanisms 410 best seen in FIG. 4C using the method described with reference to FIG. 3.

Figure 5A:
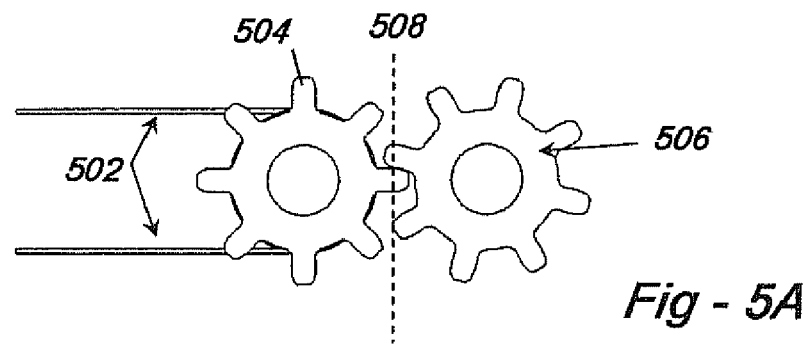
FIG. 5A shows a cable drive quick disconnect mechanism.
Figure 5B:
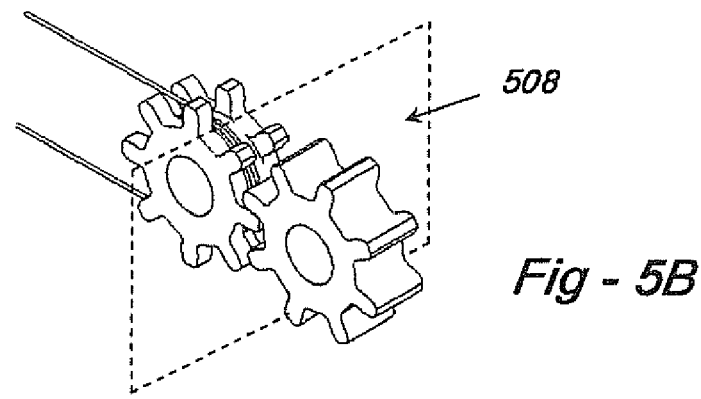
FIG. 5B shows the mechanical quick disconnect from an oblique perspective.

For tactile displays that need to be detached from the user between uses, a reciprocating mechanism may be provided separately from the cable drive. FIGS. 5A and 5B show an example of a mechanical quick disconnect from a side view and oblique perspective, respectively. Each cable 502 is guided off the user in a compact bundle which terminates at a coarse gear or frictional wheel 504. The gear or wheel cooperates with a similar gear or frictional wheel 506 on the other side of an interface plane 508, facilitating an easy mesh that is resistant to dirt and foreign particles.

Figure 6:
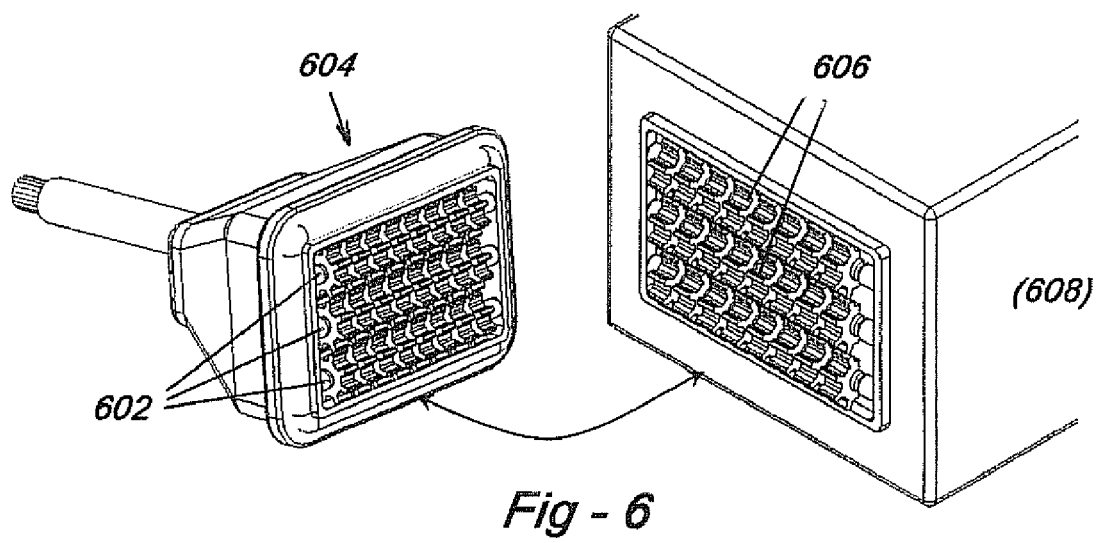
FIG. 6 illustrates how multiple rows of gears in a housing can mesh with multiple rows of drive gears in a drive housing, thereby allowing any number of reciprocating tactors to be attached and detached simultaneously.

FIG. 6 shows how multiple rows of gears 602 in a housing 604 can mesh with multiple rows of drive gears 606 in a drive housing 608. This arrangement allows any number of reciprocating tactors to be attached and detached simultaneously.

This invention may be utilized in a variety of applications in the aviation, aerospace, automotive, medical, and defense industries. The tactors described herein may provide an additional form of data input for soldiers, pilots, robot operators, uninhabited vehicle operators to indicate navigational commands, orientation information, attention cueing, obstacle warnings, etc. The tactile feedback may also be as a form of discrete communication between users such as ground soldiers, etc. In training environments, the tactors can be used to provide feedback about the environment, simulate physical events (interaction with physical structures, collisions, being hit by a bullet, etc.), providing a realistic training regime without injuring the user.

Tactors according to the invention may also be utilized in gaming and simulation environments as feedback, allowing for a more immersive, instructional, and entertaining experience. These tactors are also well suited for zero gravity situations where the devices could be used to create artificial gravity vector for improved situation awareness, attention cueing, and conveying navigation information. The tactors may also be useful in medical applications, for example, to create a sense of balance in vestibular rehabilitation patients, generating tactile stimulation for mapping responses in the somatosensory cortex in fMRI, or for safety by providing quick physical feedback for people entering sensitive areas, similar to an invisible fence for pets.

We claim:

1. A tactor system, comprising:
 a housing defining a plane adapted for placement proximate to the skin of a user;
 at least one tactor element disposed in the housing;
 a cable operative to cause the tactor element to move outwardly from the plane of the housing, thereby imparting a tactile sensation to the user's skin; and wherein:
 the tactor element is a flexible strip of material having one end coupled to the housing and another end coupled to the cable; and
 tension on the cable causes the strip to bend at a living hinge that moves outwardly from the plane of the housing.

2. The tactor system of claim 1, wherein the cable is a string, wire, rope, line, or band.

3. The tactor system of claim 1, wherein the cable is disposed in a sheath.

4. The tactor system of claim 1, wherein the cable is disposed in a sheath, enabling the cable to pull and push on the tactor element, causing the tactor element to extend outwardly, and return back into, the housing.

5. The tactor system of claim 1, wherein the cable is driven by an actuator including a reciprocating mechanism.

6. The tactor system of claim 5, wherein the reciprocating mechanism is driven by a motor, solenoid, piston, crank-slider, crank-rocker or cam.

7. The tactor system of claim 1, wherein:
 the cable is driven by an actuator; and
 the actuator receives a signal causing the tactor element to communicate a corresponding tactile sensation to a user.

8. The tactor system of claim 1, wherein the tactile sensation is used to gain the user's attention.

9. The tactor system of claim 1, wherein the tactile sensation is used to convey user orientation information, navigational directions, a gravity vector, or a message to the user.

10. A tactor system, comprising:
 a housing defining a plane adapted for placement proximate to the skin of a user;
 a tactor element disposed in the housing;
 a cable operative to cause the tactor element to move outwardly from the plane of the housing, thereby imparting a tactile sensation to the user's skin;
 wherein the cable is driven by an actuator including a reciprocating mechanism, the reciprocating mechanism including:
 a slider coupled to the cable; and
 a crank wheel coupled to the slider through a linkage.

11. The tactor system of claim 10, wherein the reciprocating mechanism further includes:
 a motorized drive wheel; and
 an idler wheel operative to selectively couple and decouple the motorized drive wheel to the crank wheel.

12. The tactor system of claim 11, wherein the idler wheel is actuated with a servo motor at low-frequency intervals.

13. A tactor system, comprising:
 a housing defining a plane adapted for placement proximate to the skin of a user;
 a tactor element disposed in the housing;
 a cable operative to cause the tactor element to move outwardly from the plane of the housing, thereby imparting a tactile sensation to the user's skin; and
 wherein the cable is driver by an actuator operative to deliver low-frequency pulses to the tactor element.

14. A tactor system, comprising:
 a housing defining a plane adapted for placement proximate to the skin of a user;
 two or more tactor elements disposed in the housing;
 a cable operative to cause the tactor element to move outwardly from the plane of the housing, thereby imparting a tactile sensation to the user's skin; and
 wherein the two or more tactor elements are each activated by a separate cable.

15. A tactor system, comprising:
 a housing defining a plane adapted for placement proximate to the skin of a user;
 two or more tactor elements disposed in the housing;
 a plurality of cables, each operative to cause a respective one of the tactor elements to move outwardly from the plane of the housing, thereby imparting a tactile sensation to the user's skin; and
 the different elements are activated at different times to enhance the apparent frequency of the stimulus.

16. A tactor system, comprising:
 a housing defining a plane adapted for placement proximate to the skin of a user;
 a pair of tactor elements disposed in the housing;
 one or more cables operative to cause each tactor element to move outwardly from the plane of the housing, thereby imparting a tactile sensation to the user's skin; and
 wherein the elements are activated out of phase with respect to one another.

17. A tactor system, comprising:
 a housing defining a plane adapted for placement proximate to the skin of a user;
 a pair of tactor elements disposed in the housing;

a cable operative to cause each tactor element to move outwardly from the plane of the housing, thereby imparting a tactile sensation to the user's skin; and wherein:

the cable has two ends, one connected to a respective one of the elements; and a reciprocating mechanism operative to move the cable back and forth, causing the elements to operate out of phase with respect to one another.

18. The tactor system of claim 17, including multiple reciprocating mechanisms driven by a single motor.

19. A tactor system, comprising:

a housing defining a plane adapted for placement proximate to the skin of a user;

a tactor element disposed in the housing;

a cable operative to cause the tactor element to move outwardly from the plane of the housing, thereby imparting a tactile sensation to the user's skin, the cable controlled by a remote reciprocating mechanism; and a physical quick disconnect mechanism between the reciprocating mechanism and the cable.

20. The tactor system of claim 19, wherein the quick disconnect mechanism further includes:

a gear or friction wheel coupled to the cable;

a mating gear or friction wheel connected to the reciprocating mechanism; and wherein the gears or friction wheels make contact on a designated interface plane to transfer motion from the reciprocating mechanism to the cable.

* * * * *